United States Patent [19]

Bouet et al.

[11] Patent Number: 5,296,261
[45] Date of Patent: Mar. 22, 1994

[54] METHOD OF MANUFACTURING A SPONGE-TYPE SUPPORT FOR AN ELECTRODE IN AN ELECTROCHEMICAL CELL

[75] Inventors: Jacques Bouet, Paris; Bernadette Pichon, Velizy, both of France

[73] Assignee: Saft, Romainville, France

[21] Appl. No.: 907,297

[22] Filed: Jul. 1, 1992

[30] Foreign Application Priority Data

Jul. 1, 1991 [FR] France .................. 91 08164

[51] Int. Cl.$^5$ .................................. B05D 5/12
[52] U.S. Cl. ......................... 427/123; 427/229; 427/245
[58] Field of Search .................... 427/123, 229, 245

[56] References Cited

U.S. PATENT DOCUMENTS 3,287,166 11/1966 Arrance ..................... 136/68
4,246,057 1/1981 Janowski et al. ............. 427/227
4,380,578 4/1983 Bahary ..................... 429/206

OTHER PUBLICATIONS

Chemical Abstracts, vol. 94, No. 20, Abstract 94:159876c "Foamed metals for batteries" Aug. 1973.

*Primary Examiner*—Kathryn Gorgos
*Attorney, Agent, or Firm*—Sughrue, Mion, Zinn, Macpeak & Seas

[57] ABSTRACT

A method of manufacturing a sponge support made of a metal selected from nickel, copper and lead, including (a) impregnating a sponge made of an organic material based on polyurethane, polyester or polyether with a solution of a nitrite or a sulfate of the metal, the concentration of the solution being a function of the desired weight per unit area for the sponge made of metal, the sponge made of an organic material has a porosity in the range of from 96% to 98% and a pore-size in the range of from 200 $\mu$m to 400 $\mu$m, and (b) heat-treating the impregnated sponge to remove the organic material.

12 Claims, No Drawings

METHOD OF MANUFACTURING A SPONGE-TYPE SUPPORT FOR AN ELECTRODE IN AN ELECTROCHEMICAL CELL

The present invention relates to a method of manufacturing a sponge-type support for an electrode in an electrochemical cell. In particular, the invention applies to nickel sponges for electrodes in/portable alkaline storage cells having high energy per unit volume.

The principle of the method is to use a support made of an organic material of the polyurethane sponge type or an analogous material, to cover the support with nickel powder, and to perform heat treatment in a reducing atmosphere so as to decompose the organic material and sinter the nickel. The object of the exercise is to obtain a microporous texture made of nickel that is analogous to the initial texture of the polyurethane sponge.

French Patent FR-A- 2,558,485 describes depositing the nickel in the pores of the organic support by means of an electrodeposition method. That method is very costly.

French Patent FR-A- 2,232,838 describes several techniques for inserting the nickel, either by spraying or filtering nickel powder or a suspension of nickel powder in water. Such techniques are generally inefficient in filling the organic support with nickel. Moreover, a uniform layer of nickel is not obtained on the inside surface of the pores in the polyurethane sponge.

An aim of the present invention is to provide a simple method enabling the metal to be deposited uniformly on a sponge made of an organic material.

The present invention provides a method of manufacturing a sponge-type support made of a metal chosen from nickel, copper, and lead, in which method a sponge-type support made of an organic material based on polyurethane, polyester, or polyether is used, said metal is applied onto said support made of an organic material, and heat treatment is performed to remove said organic material, said method being characterized by the facts that:

said sponge made of an organic material has a porosity lying in the range 96% to 98% with a pore-size lying in the range 200 micrometers ($\mu m$) to 400 $\mu m$; and the sponge made of an organic material is impregnated with a solution of a nitrate or a sulfate of said metal, the concentration of said solution being chosen as a function of the desired weight per unit area for said sponge made of metal.

In order to obtain a nickel sponge having a weight per unit area lying in the range 2 grams per square decimeter ($g/dm^2$) to 6 $g/dm^2$, the concentration of said nickel nitrate solution or said nickel sulfate solution lies in the range 2.5 moles per liter to 6 moles per liter.

In order to facilitate the impregnation of the sponge made of an organic material, said solution may contain a hydroxycolloid at a concentration lying in the range 0.5% to 2% by weight. The hydroxycolloid may be chosen from carboxymethyl cellulose, and xanthan optionally associated with carob.

In a preferred embodiment, said solution is at a temperature of the order of 80° C., and the impregnation is followed by fast cooling in air to crystallize said salt in said pores.

The thermal shock due to the sponge going from the impregnation tank to the ambient atmosphere is, itself, sufficient to start the nucleation and growth of small crystals.

The impregnated organic sponge is then heat treated for two hours in an oven in a slightly reducing atmosphere, e.g. based on nitrogen containing 10% hydrogen. It may be preferable to allow the reducing gas to bubble through water heated to about 80° C. in order to remove any traces of the organic compound of the initial support.

The heat treatment includes:

a half-hour first period at 200° C. to remove the water from the salt and the nitrogen-containing vapor (in the event that a nitrate solution is used);

a half-hour second period at 450° C. to remove the hydroxycolloid (optionally in the solution); and a one-hour third period at 1,050° C. to remove the organic support.

The method of the invention enables good-quality nickel sponges to be made having a weight per unit area lying in the range 2 $g/dm^2$ to 6 $g/dm^2$.

Other characteristics and advantages of the present invention will appear on reading the following description of embodiments given by way of non-limiting example.

All the examples used a polyurethane sponge having a thickness of 1.5 mm, with a porosity of 96% and a pore-diameter lying in the range 200 $\mu m$ to 400 $\mu m$.

EXAMPLE 1

In order to obtain a nickel sponge having a weight per unit area equal to 5 $g/dm^2$, the polyurethane foam was impregnated with a concentrated 5 mole/liter solution of nickel nitrate at a temperature of 80° C.; the solution contained 0.5% by weight of carboxymethyl cellulose. After the above-mentioned heat treatment, the nickel sponge having a weight per unit area of 5 $g/dm^2$ had a porosity of 96%.

EXAMPLE 2

In order to obtain a nickel sponge having a weight per unit area equal to 2 $g/dm^2$, the polyurethane sponge was impregnated with a 2.5 mole/liter nickel nitrate solution thickened with carboxymethyl cellulose (content: 1.5% by weight). The resulting sponge was dried at a temperature of the order of 30° C., and this resulted in a concentrated nickel film being deposited, which film lined the pores of the polyurethane sponge. After the above-mentioned heat treatment, a nickel sponge was obtained having a porosity of 96%.

EXAMPLE 3

The conditions were analogous to the conditions in example 2, but the carboxymethyl cellulose was replaced by a 50/50 mixture of xanthan and carob.

Naturally, the invention is not limited to the above-described examples. In particular, the nitrates may be replaced with sulfates, and the nickel may be replaced with copper or with lead.

We claim:

1. A method of manufacturing a sponge support made of a metal selected from the group consisting of nickel, copper and lead, comprising the steps of:

(a) first impregnating a sponge made of an organic material selected from the group consisting of polyurethane, polyester and polyether with a solution of a nitrate or a sulfate of said metal, the concentration of said solution is a function of the desired weight per unit area of said metal sponge support, said organic material sponge has a porosity in the range of from 96% to 98% and a pore-size in the range of from 200 μm to 400 μm; and (b) next heat-treating said impregnated organic material sponge to remove organic material therefrom to form said metal sponge support.

2. The method of claim 1, wherein said metal sponge support of nickel has a weight per unit area in the range of from 2 g/dm$^2$ to 6 g/dm$^2$, and said solution of a nitrate or a sulfate is a nickel nitrate solution or a nickel sulfate solution having a concentration of from 2.5 moles per liter to 6 moles per liter.

3. The method of claim 2, wherein said solution is at a temperature of about 80° C. and where said impregnated organic material sponge is fast cooled in air prior to heat-treating to crystallize a nickel nitrate salt or a nickel sulfate salt in the pores of the organic material sponge.

4. The method of claim 1, wherein said solution contains a hydroxycolloid having a concentration in the range of from 0.5% to 2% by weight.

5. The method of claim 4, wherein said hydroxycolloid is selected from the group consisting of carboxymethyl cellulose and xanthan.

6. The method of claim 4, wherein said hydroxycolloid is selected from the group consisting of xanthan and carob.

7. The method of claim 1, wherein said heat-treating is carried out for two hours in a reducing atmosphere.

8. The method of claim 1, wherein said heat-treating comprises:

heat-treating in a first period for a half-hour at 200° C.;

heat-treating in a second period for a half-hour at 450° C.;

and heat-treating in a third period for one hour at 1,050° C.;

9. The method of claim 1, wherein said heat-treating step comprises heat-treating for two hours in nitrogen containing 10% hydrogen.

10. The method of claim 1, consisting essentially of said impregnating step (a) and said heat-treating step (b).

11. The method of claim 1, wherein said metal constituting the metal sponge support is introduced into the organic material in a single impregnating step (a) as a nitrate or sulfate solution of said metal.

12. A method of manufacturing a sponge support made of a metal selected from the group consisting of nickel, copper and lead, comprising the steps of:

(a) first impregnating a sponge made of an organic material selected from the group consisting of polyurethane, polyester and polyether with a solution of a nitrate or a sulfate of said metal, the concentration of said solution is a function of the desired weight per unit area of said metal sponge support, said organic material sponge has a porosity in the range of from 96% to 98% and a pore-size in the range of from 200 μm to 400 μm;

(b) then drying said impregnated sponge to line the pores of the organic material with said metal nitrate or sulfate; and (c) next heat-treating said impregnated organic material sponge in a reducing atmosphere to remove organic material therefrom and to reduce the metal nitrate or sulfate to its metal to form said metal sponge support.

* * * * *